(12) United States Patent
Ramos et al.

(10) Patent No.: US 7,779,061 B2
(45) Date of Patent: Aug. 17, 2010

(54) REPETITIVE CONTROLLER FOR COMPENSATION OF PERIODIC SIGNALS

(75) Inventors: Jesus Leyva Ramos, San Luis Potosi (MX); Gerardo Escobar, San Luis Potosi (MX)

(73) Assignee: Instituto Potosino de Investigacion Cientifica y Tecnologica, A.C., San Luis Potosi, S.L.P. (MX)

( * ) Notice: Subject to any disclaimer, the term of this patent is extended or adjusted under 35 U.S.C. 154(b) by 1358 days.

(21) Appl. No.: 11/217,682

(22) Filed: Sep. 2, 2005

(65) Prior Publication Data

US 2007/0055721 A1 Mar. 8, 2007

(51) Int. Cl.
*G06F 17/10* (2006.01)
(52) U.S. Cl. .................................................. 708/300
(58) Field of Classification Search ............... None
See application file for complete search history.

(56) References Cited

U.S. PATENT DOCUMENTS

| | | | |
|---|---|---|---|
| 4,852,034 A | | 7/1989 | Takayama |
| 5,563,794 A * | | 10/1996 | Cosner et al. ............. 701/13 |
| 5,638,794 A * | | 6/1997 | Kubo et al. ............. 123/502 |
| 5,740,090 A * | | 4/1998 | Steinbuch et al. ......... 708/310 |
| 7,123,850 B1 * | | 10/2006 | Hamby et al. ............ 399/46 |
| 7,145,746 B1 * | | 12/2006 | Hirano et al. ............ 360/77.04 |
| 7,265,932 B2 | | 9/2007 | De Hoog |

OTHER PUBLICATIONS

Hara et al, Repetitive Control System; A New Type Servo System for Periodic Exogenous Signals, IEEE Transactions on Automatic Control, vol. 33, No. 7, Jul. 1988.*

Bodson et al., *Harmonic Generation in Adaptive Feedforward Cancellation Schemes*, IEEE Transactions on Automatic Control, vol. 39, No. 9, Sep. 1994.

Broberg et al, *A New Approach to Phase Cancellation in Repetitive Control*, Industry Applications Society Annual Meeting, 1766-1770, 1994.

Costa-Castello et al., *Odd-Harmonic Digital Repetitive Contorl of a Single-Phase Current Active Filter*, IEEE Transactions on Power Electronics, vol. 19, No. 4, Jul. 2004.

Lin et al., *Compensation of MR Head Non-Linearities Using a Saturable Transfer Function*, IEEE Transactions on Magnetics, vol. 36, No. 5, Sep. 2000.

Non-final Office Action in U.S. Appl. No. 11/232,234, mailed May 8, 2009, 23 pages.

Steinbuch, *Repetitive Control for Systems with Uncertain Period-time*, Automatica 38, pp. 2103-2109, 2002.

* cited by examiner

*Primary Examiner*—David H Malzahn
(74) *Attorney, Agent, or Firm*—Fish & Richardson P.C.

(57) ABSTRACT

A repetitive controller scheme with positive feedback and feedforward introduces infinitely many poles on the imaginary axis located at the resonant peaks. The feedforward introduces zeros, which produce notches located in between two consecutive resonant peaks. The latter has the advantage of making the controller more selective, in the sense that; the original overlapping (appearing at the valleys in a simple positive feedback repetitive controller) or interaction between consecutive resonant peaks is removed by the notches. This would allow, in principle, peaks of higher gains and slightly wider bandwidth, avoiding, at the same time, the excitation of harmonics located in between two consecutive peaks. The repetitive controller includes a simple Low Pass Filter (LPF). This modification restricts the bandwidth of the controller and at the same time reinforces stability when the controller is inserted in the closed-loop system.

12 Claims, 3 Drawing Sheets

REPETITIVE CONTROLLER FOR COMPENSATION OF PERIODIC SIGNALS

BACKGROUND

The compensation of harmonic disturbances is a subject that has attracted the attention of many researchers in the last decades. In this sense, repetitive control arises as a practical solution to such issue and is based on the well-known internal model principle. For a detailed description of the internal model principle, reference is made to B. Francis and W. Wonham, "The internal model principle for linear multivariable regulators," Applied Mathematics and Optimization, Vol. 2, pp. 170-194, 1975, which is incorporated by reference. For a description of a stability study of linear infinite dimensional repetitive controllers, reference is made to S. Hara, Y. Yamamoto, T. Omata and M. Nakano, "Repetitive control systems: A new type servo systems and its applications," IEEE Trans. Automat. Contr., Vol. 33, No. 7, pp. 659-667, 1988 and the numerous references therein. Repetitive control is a potential solution to many precision systems, such as industrial robots, disc drives, numerical control machines, and servo scanners. Roughly speaking, repetitive control is applicable to almost any system that rotates or repeats the same task on a periodic time basis. The harmonic compensation issue can have a special impact in the power electronics and power systems applications where the disturbances to cancel and/or reference signals to track are composed of specific higher harmonics of the fundamental frequency of the power supply. There is a high potential in using repetitive control on power electronic systems such as rectifiers, inverters and active filters.

The internal model principle states that a controlled output can track a class of reference commands without a steady state error if the generator (or the model) of the reference is included in the stable closed-loop system. Therefore, it can be used to provide exact asymptotic output tracking of periodic inputs or to reject periodic disturbances. It is well known that the generator of a sinusoidal signal (i.e., a signal containing only one harmonic component) is a harmonic oscillator or, in other words, a resonant filter.

Thus, following this idea, if a periodic signal has an infinite Fourier series (of harmonic components), then an infinite number of harmonic oscillators are required to track or reject such a periodic signal. Fortunately, in the repetitive control approach, a simple delay line in a proper feedback array can be used to produce an infinite number of poles and thereby simulate a bank of an infinite number of harmonic oscillators leading to a system dynamics of infinite dimension. The delay line is also referred to as a transport (digital or analog) delay. The use of repetitive control for a reduction of periodic disturbances with frequencies corresponding to the specific frequencies is disclosed in U.S. Pat. No. 5,740,090, where the transfer function of the controller includes an infinite number of poles, with no zeros introduced between the poles.

SUMMARY

A feedback scheme with a delay line may be used to provide positive feedback control. The positive feedback approach is able to compensate for all harmonics. Moreover, a feedforward path may be added to this scheme. The motivation for this modification is to introduce zeros, which lie between the poles, so as to improve the selective nature of the whole controller, which will in principle allow higher gains and better performance. The delay line can be implemented either in a digital or an analog manner. An experimental test for the laboratory to show the performance of such controllers is given. As an example, the delay line has been implemented using an analog integrated circuit (IC). This IC is an analog device that is very simple to tune for the exact delay, and has a high signal-to-noise ratio; such that, precision is not lost during the delay. An IC of this type often is used in the music industry to create reverberation and echo effects in audio equipment.

Thus, a repetitive controller scheme with positive feedback and feedforward is described. Repetitive controllers can be a useful tool for tracking of periodic reference signals or for rejection of periodic disturbances, in other words, for harmonic compensation. It is shown that the feedforward modification considerably improves the frequency response and performance providing higher gains with enhanced selectivity. Descriptions of the techniques and their corresponding experimental frequency responses are given.

Other forms, features, and aspects of the above-described methods and system are described in the detailed description that follows.

BRIEF DESCRIPTION OF DRAWINGS

The invention will be more fully understood from the following detailed description taken in conjunction with the accompanying drawings in which.

DETAILED DESCRIPTION

Figure 1:
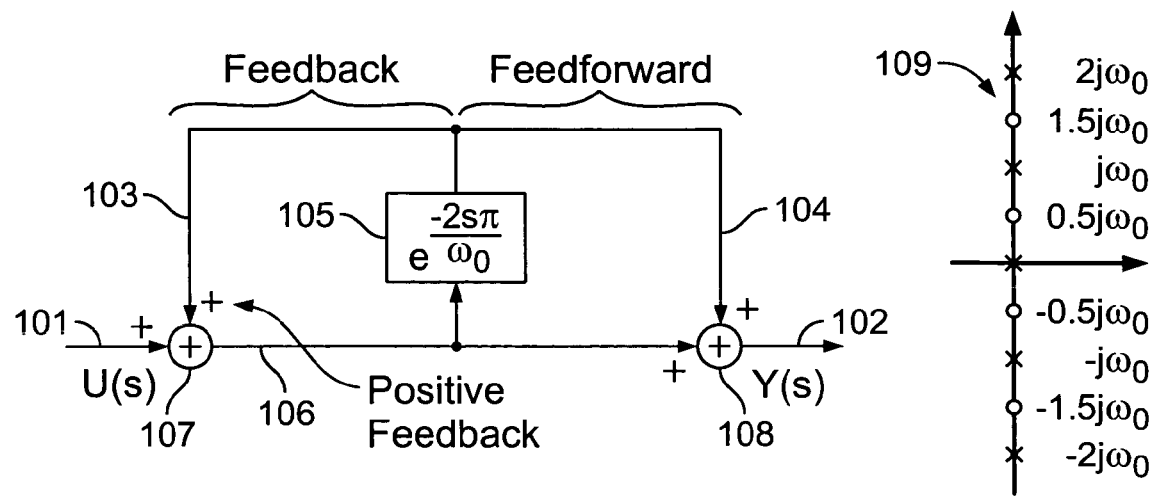
FIG. 1 shows a block diagram of the proposed repetitive controller with positive feedback and feedforward.

The block diagram of the repetitive controller with positive feedback 103 and including the feedforward path 104 is shown in FIG. 1. The resulting transfer function is:

$$G(s) = \frac{Y(s)}{U(s)} = \frac{1+e^{-\frac{2s\pi}{\omega_o}}}{1-e^{-\frac{2s\pi}{\omega_o}}}$$

where Y(s) 102 is the output, U(s) 101 is the input, and $\omega_o$ represents, throughout this document, the fundamental frequency of the periodic signal under compensation. An adder 107 outputs a signal 106, which is the addition of the input signal with the feedback. Another adder 108 outputs a signal, which is the addition of the feedforward, and the signal from the previous adder 106. Notice that the delay line is represented by a block 105, with s being the Laplace operator, e being the basic value of the natural logarithm, and the delay time being $t_d = 2\pi/\omega_o$.

The poles of the representation can be found from $e^{-2s\pi/\omega_o} = 1$. Notice that the complex number $e^{-2s\pi/\omega_o}|_{s=j\omega}$ equals 1 for $\omega = k\omega_o$ for every k=0, 1, 2, . . . , and $e^{-2s\pi/\omega_o}|_{s=j\omega}$ equals $-1$ for $\omega = (2k-1)\omega_o/2$ for every k=1, 2, 3, . . . . Due to the delay line, this transfer function has infinitely many poles on the imaginary axis 109. Notice that, with the introduction of the feedforward path, an infinite number of zeros also appear on the imaginary axis 109. The corresponding transfer function for this controller can also be written as:

$$G(s) = \frac{1+e^{-\frac{2s\pi}{\omega_o}}}{1-e^{-\frac{2s\pi}{\omega_o}}} = \frac{e^{\frac{s\pi}{\omega_o}}+e^{-\frac{s\pi}{\omega_o}}}{e^{\frac{s\pi}{\omega_o}}-e^{-\frac{s\pi}{\omega_o}}}$$

or equal to $$= \frac{\cosh\left(\frac{s\pi}{\omega_o}\right)}{\sinh\left(\frac{s\pi}{\omega_o}\right)} = \frac{\prod_{k=1}^{\infty}\left(\frac{s^2}{\left(\frac{2k-1}{2}\right)^2\omega_o^2}+1\right)}{\frac{s\pi}{\omega_o}\prod_{k=1}^{\infty}\left(\frac{s^2}{k^2\omega_o^2}+1\right)}.$$

Notice that the positive feedback controller contains harmonic oscillators tuned at all harmonics of the fundamental frequency $\omega_o$. That is, for G(s), the first pole lies at the origin and the rest of the poles lie at multiples (higher harmonics) of $\omega_o$. Notice also that each zero of G(s) lies exactly in the middle point between two consecutive poles.

Conversely, if the fundamental frequency is known, then the delay time is computed using $\tau_d = 2\pi/\omega_o = 1/f_o$, where $\omega_o = 2\pi f_o$. For instance, if compensation of harmonics of 120 Hz is required, taking $f_o = 120$ Hz, then the corresponding delay is $t_d = 8.333$ ms.

Figure 2:
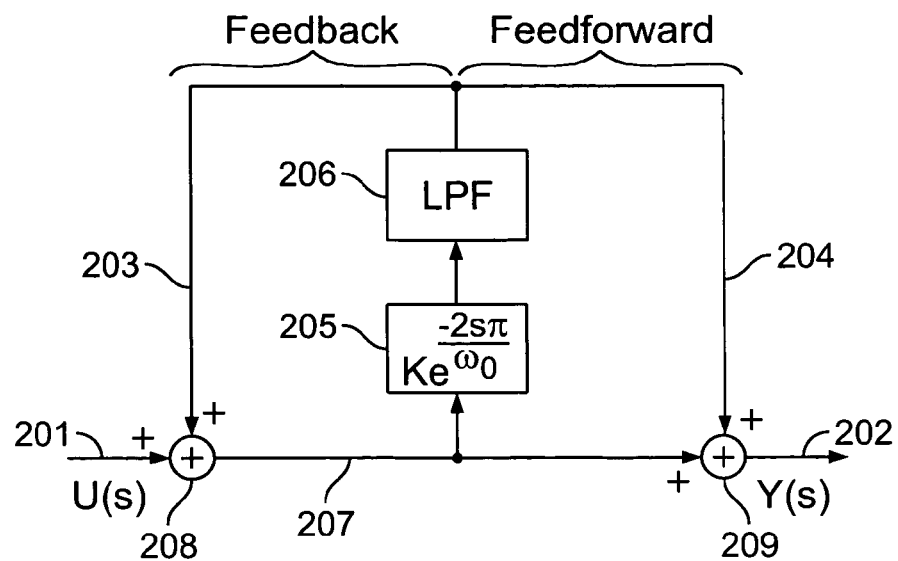
FIG. 2 shows a block diagram of practical modifications for the repetitive controller described herein.

The above repetitive controller, however, may be unsuited for use in a real application. The expected Bode plots for the controller consist of a set of peaks centered at the harmonic frequencies. Moreover, thanks to the presence of the zeros, notches appear in the middle points between two consecutive peaks. The gain at the resonant frequencies is, in theory, infinite, while for the notches it goes to zero (minus infinite in dB); therefore, instability problems may arise. To alleviate this issue, damping is added to all the poles/zeros by slightly shifting them to the left of the imaginary axis. As a consequence of this simple pole/zero shifting process, the peaks amplitude becomes bounded. This shifting process is realized as follows: Ğ(s)=G(s+a). Applying the shifting to the exponential term results in $e^{-2(s+a)\pi/\omega_o} = e^{-2a\pi/\omega_o}e^{-2s\pi/\omega_o}$. Notice that this is equivalent to multiplying the exponential function by a gain factor $K = e^{-2a\pi/\omega_o}$ as shown in FIG. 2. Hence, by proposing a gain K>1, the poles/zeros move to the right, but if 0<K<1 then they move to the left. Moreover, it is easy to show that the resonant peaks, originally of infinite magnitude, reach a maximum magnitude of (1+K)/(1−K), while the notches reach a minimum magnitude of (1−K)/(1+K).

It can be noticed that without feedforward, the maximum attainable gain is 1/(1−K), which is evidently smaller than the one considering feedforward. Moreover, in this case, there are simply valleys between the peaks whose minimum attainable gain are 1/(1+K), and no longer notches.

It is also recommended, in repetitive control schemes, to include a simple Low Pass Filter (LPF) as shown in FIG. 2, where Y(s) 202 is the output, U(s) 201 is the input, and $\omega_o$ represents the fundamental frequency of the periodic signal under compensation. An adder 208 outputs a signal 207, which is the addition of the input signal with the feedback 203. Another adder 209 outputs a signal, which is the addition of the feedforward 204, and the signal 207 from the previous adder 208. Notice that the block 205 contains the delay line and the gain K and block 206 represents the low pass filter.

The addition of the LPF restricts the bandwidth of the controller while simultaneously reinforcing stability when the controller is installed. However, it may produce some slight inaccuracies as described next. As a consequence of all these modifications, two side effects appear: first, resonant peaks and notches are slightly shifted with respect to the corresponding harmonic frequency, and second, an almost imperceptible phase shift appears at the tuned harmonic frequencies.

As observed with respect to FIG. 1, the repetitive controller originally contained a pole in the origin, i.e., an integrator, which is in most cases unnecessary and may lead to instability. Notice, however, that this pole at the origin has been shifted to the left and placed at s=−a. Notice also that $a = -f_o \cdot \ln(K)$ in r/s, and thus, this zero approaches the origin for values of K approaching the unity. For instance, for $f_o = 120$ Hz and K=0.95, the resulting value for a is 6.15 r/s (0.98 Hz).

Figure 3:
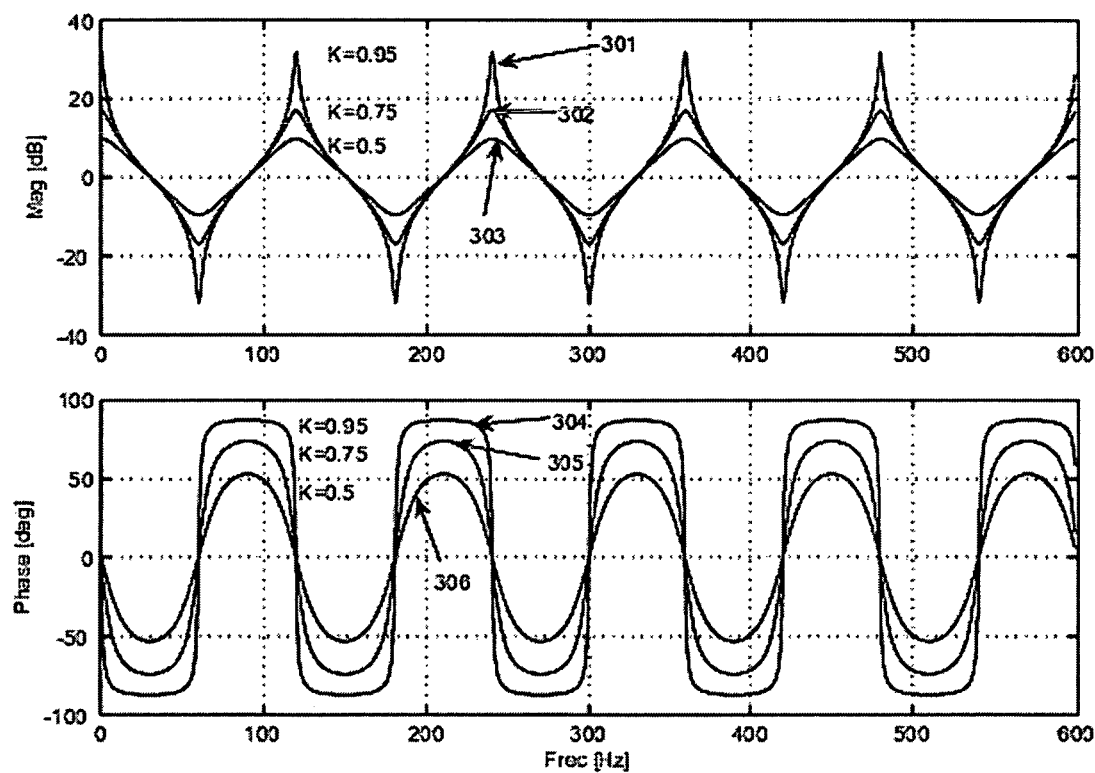
FIG. 3 shows theoretical Bode plots of the repetitive controller for different values of K (0.95, 0.75, and 0.5). (top) Magnitude (y-axis dB, x-axis Hz), and (bottom) phase (y-axis deg, x-axis Hz).

FIG. 3 shows the theoretical Bode plots of Ğ(s) for the compensation of harmonics of 120 Hz and for several values of K. In this case, the delay time is fixed to $t_d = 8.33$ ms. For K=0.95, the plot 301 goes from 31.82 dB at the resonant frequencies to −31.82 dB at the notches. However, if the gain is reduced to K=0.75, the corresponding maximum and minimum magnitudes for the plot 302 are 16.90 dB and −16.90 dB, respectively. A further reduction to K=0.5 results in maximum and minimum magnitudes for the plot 303 of 9.54 dB and −9.54 dB, respectively. These plots show clearly that, as gain K decreases, the peak amplitude is reduced while the bandwidth of each peak increases, thus increasing its robustness with respect to frequency variations. Notice that the corresponding phase plots 304, 305 and 306 have the interesting feature that the phase shift is zero exactly at the resonance frequency and is bounded by 90 and −90 degrees.

An analog circuit implementing the repetitive controller has been implemented in the laboratory for experimental test. The delay line appearing in the repetitive scheme has been implemented using a special purpose delay line IC. In many power electronics applications, compensation of harmonics for 120 Hz and 60 Hz are required, therefore, delays ranging from $t_d = 8.33$ ms to $t_d = 16.66$ ms should be implemented. For the experimental tests presented here, the compensation of harmonics of 120 Hz has been chosen. Therefore, a delay of $t_d = 8.33$ ms is implemented for the repetitive controller. It also is clear that a digital implementation could be implemented. In this case, the discretization of the delay line is a simple task, and it is enough to guarantee a relatively large memory stack where data could be stored to be released after a time delay.

Figure 4:
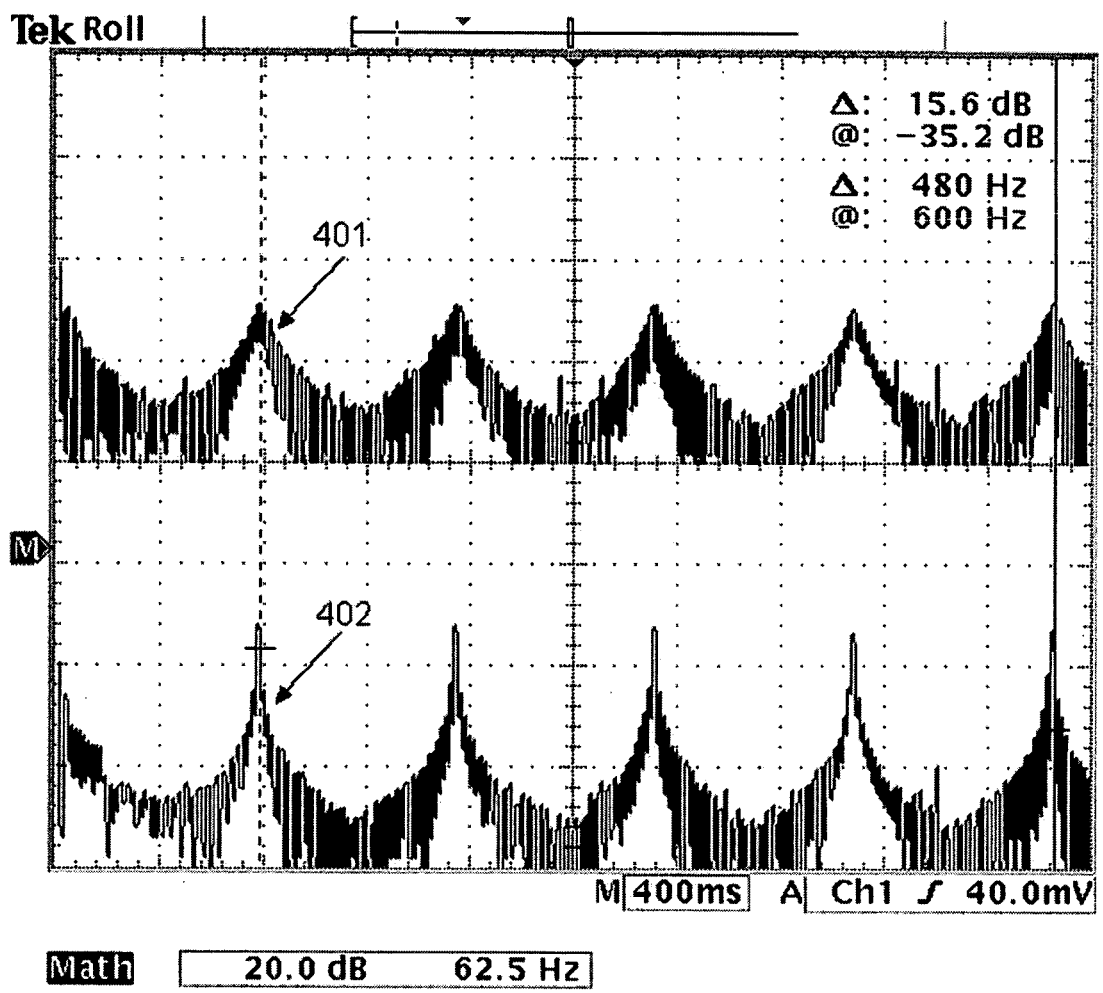
FIG. 4 shows an experimental frequency response for the repetitive controller (x-axis 62.5 Hz/div and y-axis 10 dB/div): (Top) K=0.824, and (Bottom) K=0.955.

The experimental frequency responses of output y(t) for the controller are shown in FIG. 4 for K=0.824 (401) and K=0.955 (402). The plot shows that the circuit contains peaks centered at the expected values (i.e., all harmonics of 120 Hz).

What is claimed is:

1. A repetitive controller with positive feedback and feedforward, the repetitive controller including:
    a first adder,
    a second adder, and
    a time delay circuit for imparting a time delay,
    wherein the first adder receives an input periodic signal inputted into the controller for compensation and also receives a feedback signal,
    wherein the first adder outputs a first output signal corresponding to a summation of the input periodic signal and the feedback signal,
    wherein the second adder receives the first output signal and a feedforward signal,
    wherein the second adder outputs a controller output signal, the controller output signal corresponding to a summation of the first output signal and the feedforward signal and the controller output signal corresponding to the input periodic signal after being compensated by the repetitive controller, wherein the feedforward signal corresponds to the first output signal delayed by the time delay circuit, and wherein the feedback signal corresponds to the first output signal delayed by the time delay circuit.

2. The repetitive controller of claim 1, wherein the time delay circuit is implemented in analog form.

3. The repetitive controller of claim 1, wherein the time delay circuit is implemented in digital form.

4. The repetitive controller of claim 1, wherein the controller has a transfer function given by:

$$G(s) = \frac{Y(s)}{U(s)} = \frac{1+e^{-\frac{2s\pi}{\omega_o}}}{1-e^{-\frac{2s\pi}{\omega_o}}}$$

where s is a Laplace operator, $Y(s)$ represents the controller output signal, $U(s)$ represents the input periodic signal, and $\omega_0$ represents the fundamental frequency of the input periodic signal under compensation where the corresponding time delay is given by $t_d = 2\pi/\omega_0$.

5. The repetitive controller of claim 1, wherein, due to the time delay circuit imparting a delay to the first output signal for the feedforward signal and for the feedback signal, the controller has a transfer function with an infinite number of poles located on an imaginary axis of an s-plane at $\omega = k\omega_0$ for every k=0, 1, 2, ..., and an infinite number of zeros located on the imaginary axis at $\omega = (2k-1)\omega_0/2$ for every k=1, 2, 3, ..., and wherein $\omega_0$ represents a fundamental frequency of the input periodic signal inputted into the controller for compensation.

6. The repetitive controller of claim 1, wherein the controller has a transfer function having a first pole on an s-plane that lies at the origin and infinite other poles that lie at multiples (higher harmonics) of $\omega_o$, the transfer function further having infinite zeros on the s-plane that each lie exactly in a middle point between two consecutive poles of the transfer function, and wherein $\omega_o$ represents a fundamental frequency of the input periodic signal inputted into the controller for compensation.

7. The repetitive controller of claim 1, wherein the controller has an expected Bode plot that includes, due to presence of poles in a transfer function of the repetitive controller, a set of peaks centered at all harmonic frequencies of a fundamental frequency of the input periodic signal; and due to presence of zeros in the transfer function of the repetitive controller, a set of notches, each notch in the set of notches appearing at middle point between two consecutive peaks of the set of peaks, such that gain at resonant frequencies is substantially-infinite at each of the peaks of the set of peaks and zero at each of the notches of the set of notches.

8. The repetitive controller of claim 1, wherein the controller further includes an amplifier that applies a gain factor of K, wherein the feedforward signal corresponds to the first output signal delayed by the time delay circuit and amplified by the amplifier, wherein the feedback signal corresponds to the first output signal delayed by the time delay circuit and amplified by the amplifier, and wherein the amplifier adds damping to the repetitive controller by slightly shifting all poles and zeros of a transfer function of the repetitive controller to a location on an s-plane that is left of an imaginary axis of the s-plane, such that a peak amplitude becomes bounded and, in effect, the gain factor of K is applied.

9. The repetitive controller of claim 8, wherein resonant peaks of the transfer function as displayed in a Bode plot reach a maximum magnitude of $(1+K)/(1-K)$, and notches of the transfer function as displayed in the Bode plot reach a minimum magnitude of $(1-K)/(1+K)$ when $0<K<1$.

10. The repetitive controller of claim 8, wherein the controller further includes a simple Low Pass Filter (LPF) to restrict a bandwidth of the controller, and at the same time reinforce stability when the controller is inserted into a closed-loop system.

11. The repetitive controller of claim 10, wherein the feedforward signal corresponds to the first output signal delayed by the time delay circuit, amplified by the amplifier, and filtered by the simple LPF, and wherein the feedback signal corresponds to the first output signal delayed by the time delay circuit, amplified by the amplifier, and filtered by the simple LPF.

12. The repetitive controller of claim 1, wherein the time delay $t_d$ is equal to $2\pi/\omega_o$, and wherein $\omega_o$ represents a fundamental frequency of the input periodic signal inputted into the controller for compensation.

\* \* \* \* \*